(12) United States Patent
Kawakubo et al.

(10) Patent No.: US 7,121,373 B2
(45) Date of Patent: Oct. 17, 2006

(54) MOTORCYCLE

(75) Inventors: Hiroyuki Kawakubo, Wako (JP); Toru Gunji, Wako (JP); Hiromi Sumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 10/836,462

(22) Filed: Apr. 30, 2004

(65) Prior Publication Data

US 2004/0238255 A1    Dec. 2, 2004

(30) Foreign Application Priority Data

May 30, 2003    (JP)    ............................. 2003-155356

(51) Int. Cl.
 *B62M 7/00*    (2006.01)
(52) U.S. Cl. ...................... 180/227; 475/219
(58) Field of Classification Search ................ 180/219, 180/227
 See application file for complete search history.

(56) References Cited

U.S. PATENT DOCUMENTS

| | | | | |
|---|---|---|---|---|
| 4,427,088 | A * | 1/1984 | Tsuboi ......................... | 180/219 |
| 4,511,013 | A * | 4/1985 | Miyakoshi et al. ......... | 180/227 |
| 4,523,491 | A * | 6/1985 | Dittmann, Jr. ............... | 74/360 |
| 4,754,662 | A * | 7/1988 | Misawa ..................... | 74/473.22 |
| 5,657,830 | A * | 8/1997 | Kawashima et al. ........ | 180/220 |
| 6,516,909 | B1 * | 2/2003 | Gogo ......................... | 180/219 |
| 6,601,666 | B1 * | 8/2003 | Okuma et al. .............. | 180/227 |
| 6,679,347 | B1 * | 1/2004 | Iimuro ....................... | 180/219 |
| 6,845,836 | B1 * | 1/2005 | Inaoka et al. ............... | 180/228 |
| 6,913,101 | B1 * | 7/2005 | Uneta et al. ................ | 180/227 |
| 2002/0189878 | A1 * | 12/2002 | Iimuro ....................... | 180/219 |
| 2004/0124604 | A1 * | 7/2004 | Takano ....................... | 280/283 |
| 2004/0130123 | A1 * | 7/2004 | Uneta et al. ................ | 280/284 |

FOREIGN PATENT DOCUMENTS

| | | |
|---|---|---|
| JP | 62-25290 | 2/1987 |
| JP | 2000-282884 | 10/2000 |
| JP | 2002-347685 | 12/2002 |

\* cited by examiner

*Primary Examiner*—Tony Winner
(74) *Attorney, Agent, or Firm*—Hamre, Schumann, Mueller & Larson, PC (57) ABSTRACT

To advance the pivotally supporting point of a swing arm on a vehicle body frame, the distance in the forward and backward direction between a crankshaft and a countershaft of a transmission is decreased as much as possible thereby making the length of the swing arm great and sufficiently absorb upward and downward oscillation of a rear wheel to achieve stabilization of the vehicle body.

A countershaft is disposed below a main shaft of the transmission while a shift drum is disposed rearwardly of the main shaft, and a driving sprocket wheel for driving a rear wheel is provided on the countershaft. An internal combustion engine is disposed on the vehicle body frame such that a rear portion of a transmission is positioned above a pivotally supporting point of a swing arm. By the configuration, the pivotally supporting point of the swing arm can be advanced with respect to the internal combustion engine, and also the movable range of a rear portion of the swing arm is increased and the variation of the posture of the vehicle body can be reduced.

4 Claims, 6 Drawing Sheets

FIG.7

MOTORCYCLE

FIELD OF THE INVENTION

This invention relates to an internal combustion engine carried on a motorcycle, and more particularly to arrangement of an internal combustion engine and accessories on a vehicle body frame and arrangement of a rotary shaft and a shift drum in a transmission provided in the internal combustion engine.

BACKGROUND OF THE INVENTION

Japanese Patent Laid-open No. Sho 62-25290 discloses a conventional internal combustion engine carried on a motorcycle, a main shaft of a transmission is disposed rearwardly of a crankshaft, and a countershaft of the transmission is disposed rearwardly of the main shaft. Further, a pivot shaft on which a swing arm for supporting a rear wheel for rotation thereon is supported for rocking motion is disposed rearwardly of the countershaft. In other words, the shafts are all disposed at the substantially same height. The countershaft is an output power shaft, and the rear wheel is driven through a rear wheel driving sprocket wheel provided on the countershaft and a chain extending around the sprocket wheel. The countershaft is disposed substantially on a forward extension line of a line interconnecting the axle of the rear wheel and the pivot shaft of the swing arm so that no irrational interference may occur between the rocking motion of the swing arm and rocking motion of the chain.

Also a conventional example is available wherein a cartridge type transmission is formed using the rotary shaft arrangement described above. In this instance, the shift drum is provided below an intermediate location between the main shaft and the countershaft.

With the arrangement of the conventional transmission shafts described above, since the distance between the crankshaft and the countershaft is great, the position of the pivot shaft of the swing arm is retracted inevitably. If it is considered that the position of the crankshaft and the position of the rear wheel axle are fixed, then if the distance between the crankshaft and the countershaft is great, the distance between the pivot shaft of the swing arm and the rear wheel axle is small. In other words, it cannot be avoided to form the swing arm short. Where the swing arm is short, the rocking angle of the switching arm with respect to the same upward and downward oscillation is great, and a burden is imposed on a shock absorbing structure. Further, where the rocking angle is equal, if the swing arm is short, then the structure cannot sufficiently absorb great upward and downward oscillation of the rear wheel. Furthermore, if the swing arm is formed longer while the conventional transmission shaft arrangement is maintained, then the distance between the front and rear wheels increases.

From the reason described above, it is demanded to decrease the distance in the forward and backward direction between the crankshaft and the countershaft as much as possible to advance the pivotally supporting point of the swing arm on the vehicle body frame thereby to make the length of the swing arm great and sufficiently absorb upward and downward oscillation of the rear wheel to achieve stabilization of the vehicle body.

SUMMARY OF THE INVENTION

The present invention solves the problem described above by providing a motorcycle comprising an internal combustion engine supported on a vehicle body frame and including a crankshaft extending in leftward and rightward directions of a vehicle body, a swing arm supported for pivotal motion on the vehicle body frame, a sprocket wheel provided on the internal combustion engine for driving a rear wheel supported for rotation at a rear end portion of the swing arm, and a transmission forming part of the internal combustion engine for transmitting rotational motion of the crankshaft to the sprocket wheel. The transmission is a cartridge type transmission, and the internal combustion engine is disposed on the vehicle body frame such that a rear portion of the cartridge type transmission is positioned above the pivotally supporting point of the swing arm.

Since the present invention has such a configuration as described above, the pivotally supporting point of the swing arm can be advanced with respect to the internal combustion engine, and the movable range of the rear portion of the swing arm is increased and the variation of the posture of the vehicle body can be reduced. Further, where the transmission is formed as a cartridge type transmission, it is easier to take out the rotary shafts and gear section of the transmission, and inspection and replacement of a part of the transmission are facilitated.

The cartridge type transmission includes a main shaft, a countershaft, and a shift drum parallel to the crankshaft, and in a state wherein the cartridge type transmission is carried on the vehicle, the countershaft is positioned below the main shaft and the shift drum is disposed rearwardly of the main shaft, and a driving sprocket wheel for driving the rear wheel is provided on the countershaft.

Since the present invention has such a configuration as described above, a free space is formed below the shift drum rearwardly of the countershaft. Thus, by disposing the pivot shaft of the swing arm in the free space, the pivotally supporting point of the swing arm can be advanced with respect to the internal combustion engine.

Further, a motorcycle includes an internal combustion engine supported on a vehicle body frame and including a crankshaft extending in leftward and rightward directions of a vehicle body, a swing arm supported for pivotal motion on the vehicle body frame, a sprocket wheel provided on the internal combustion engine for driving a rear wheel supported for rotation at a rear end portion of the swing arm, and a transmission forming part of the internal combustion engine for transmitting rotational motion of the crankshaft to the sprocket wheel. The internal combustion engine is disposed on the vehicle body frame such that a gear position detection apparatus for detecting a rotational position of a shift drum provided in the transmission is positioned above the pivotally supporting point of the swing arm.

Since the present invention has such a configuration as described above and the swing arm is disposed below the gear position detection apparatus, the swing arm serves as a barrier and prevents such solid matter as a stone leaping up from the road surface during traveling of the vehicle from colliding with the gear position detection apparatus. Consequently, protection of the sensor can be anticipated.

BRIEF DESCRIPTION OF THE DRAWINGS

FIG. 4(*a*) is an enlarged plan view of a gear shift position detection apparatus.

FIG. 4(*b*) is an enlarged plan view of a gear shift position detection apparatus.

FIG. 5(*a*) is an enlarged plan view of a resilient contact member, which is a counterpart member of the gear shift position detection apparatus.

FIG. 5(*b*) is an enlarged plan view of a resilient contact member, which is a counterpart member of the gear shift position detection apparatus.

DETAILED DESCRIPTION OF THE INVENTION

Figure 1:
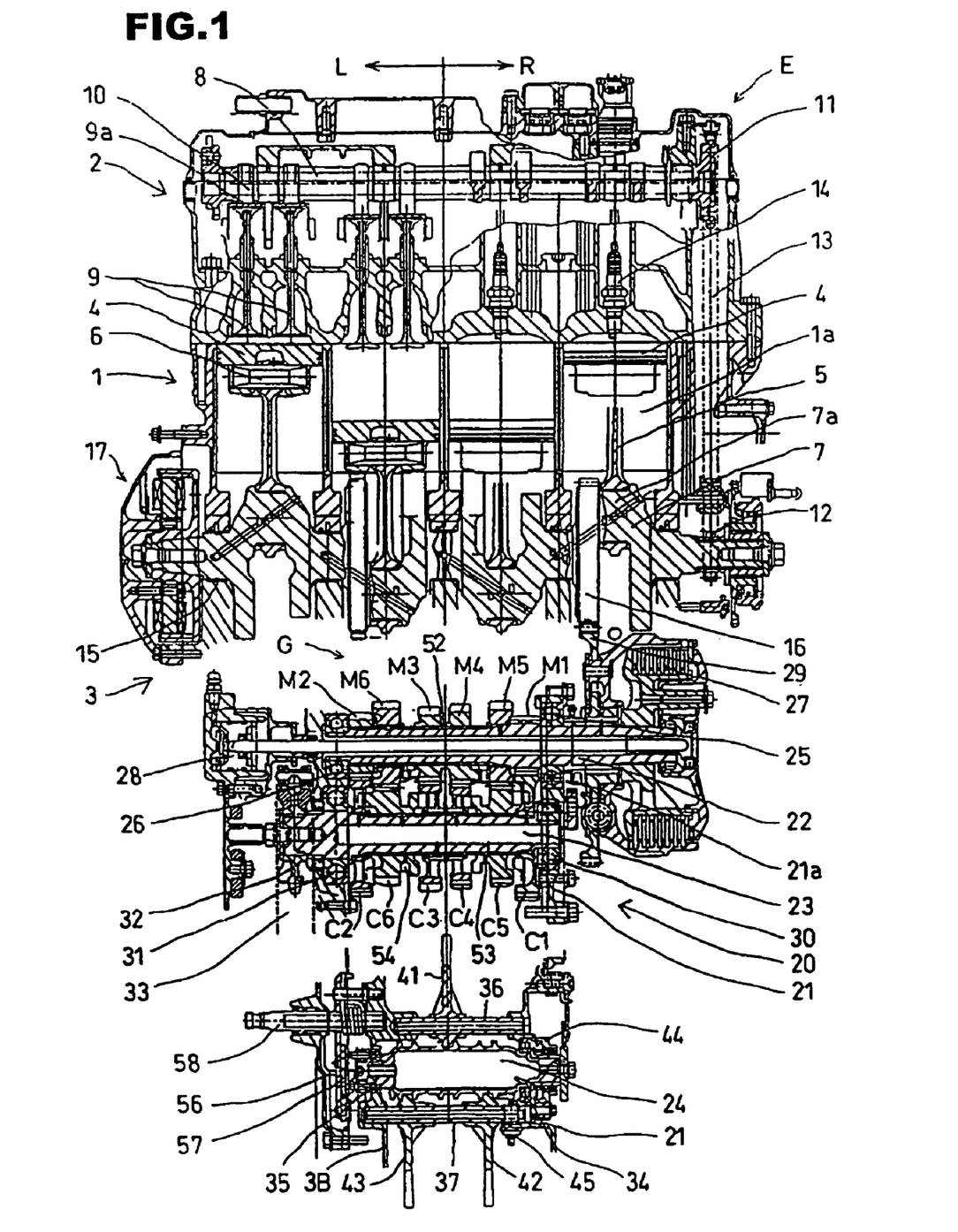
FIG. 1 is a development sectional view showing a structure of an internal combustion engine of the present invention.
Figure 2:
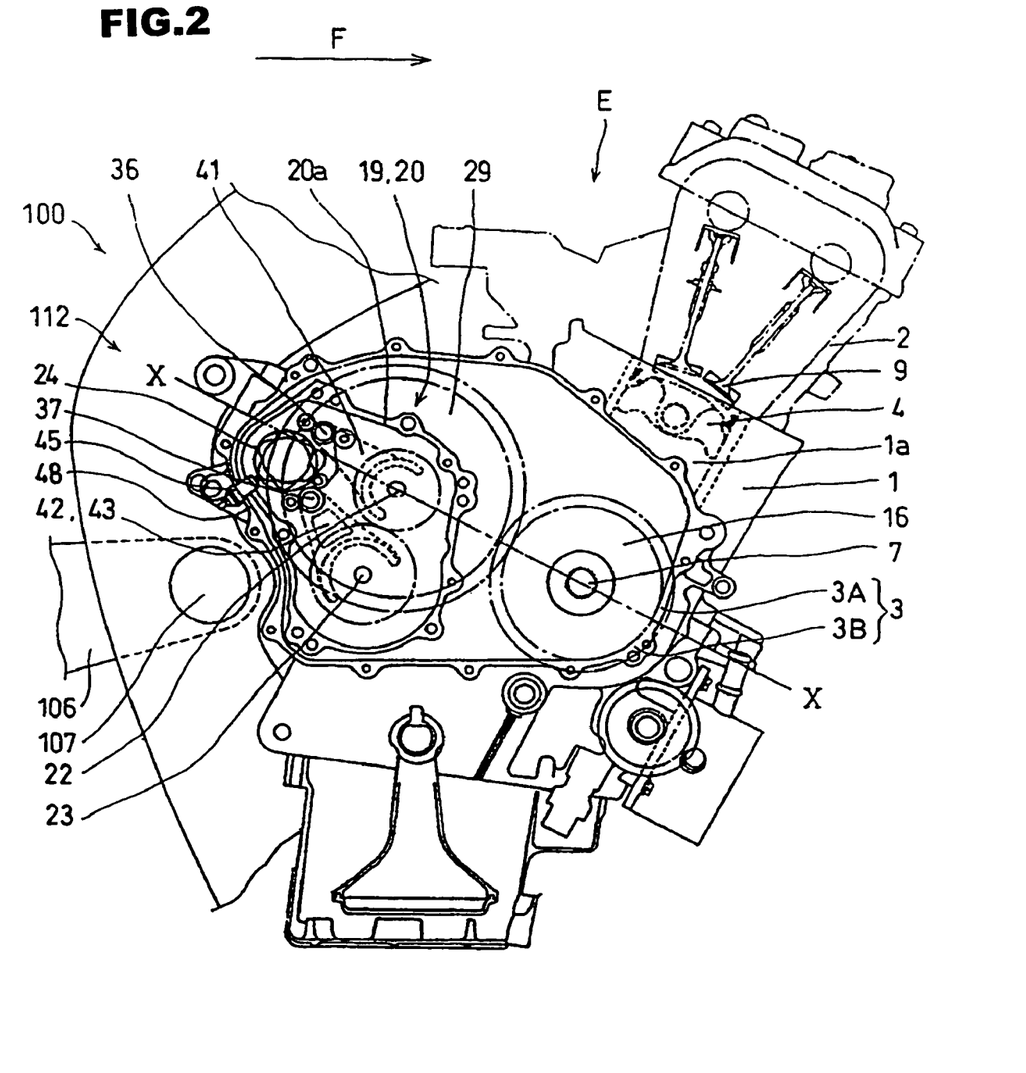
FIG. 2 is a side elevational view of the internal combustion engine of the present invention.

FIG. 1 is a development of an internal combustion engine E regarding a cylinder section and several rotary shafts, and FIG. 2 is a side elevational view of the internal combustion engine E. In FIG. 1, an arrow mark L at an upper portion indicates a leftward direction and another arrow mark R indicates a rightward direction, and in FIG. 2, an arrow mark F indicates a forward direction. The internal combustion engine E is a four-stroke cycle four-cylinder internal combustion engine, and a body structure section thereof includes a cylinder block 1, a cylinder head 2 secured to the cylinder block 1 by means of bolts, and a crankcase 3 as shown in FIG. 1. The crankcase 3 has a two-piece structure divided into an upper case 3A and a lower case 3B along a plane X—X as shown in FIG. 2. The upper case 3A and the cylinder block 1 are formed integrally with each other.

Referring to FIG. 1, four cylinder holes 1*a* are provided in the cylinder block 1 such that the holes 1*a* are directed in a vehicle widthwise direction, and a piston 4 is fitted for sliding movement in each of the cylinder holes 1*a* and attached for rocking motion to a minor end portion of a connecting rod 5 through a piston pin 6. A major end portion of the connecting rod 5 is connected for turning motion to a crankpin 7*a* of a crankshaft 7 such that the crankshaft 7 is driven to rotate in the clockwise direction in FIG. 2 in an interlocking relationship with back and forth movements of the piston 4.

Referring to FIG. 1, a camshaft 8 and intake and exhaust valves 9, which open and close intake and exhaust ports upon rotation of the camshaft 8, are provided on the cylinder head 2. Each of the intake and exhaust valves 9 is normally biased to a closing state by a valve spring, and when the camshaft 8 rotates, a cam 10 pushes a tappet 9*a* at an upper portion of the intake or exhaust valve 9 to open the valve 9 so that predetermined intake or exhaust of air is performed.

Rotational driving of the camshaft 8 for operating the intake and exhaust valves 9 is performed through a driven sprocket wheel 11 provided at an end of the camshaft 8, a driving sprocket wheel 12 provided on the crankshaft 7, and a timing chain 13 extending between and around the driven sprocket wheel 111 and the driving sprocket wheel 12. The camshaft 8 is driven to rotate at a speed of rotation equal to one half that of the crankshaft 7 so that, while the crankshaft 7 makes two rotations, each of the intake and exhaust valves 9 is opened and closed once. It is to be noted that an ignition plug 14 is mounted on the cylinder head 2 at a position at which it is opposed to a combustion chamber at an upper portion of each of the cylinder holes.

The crankshaft 7 is disposed in the crankcase 3. The crankshaft 7 is supported for rotation on the crankcase 3 through a journal bearing section 15, and a primary driving gear 16 is attached to a position of the crankshaft 7 near to the right side end. The primary driving gear 16 transmits power of the crankshaft 7 to a main shaft 22 of a transmission. It is to be noted that reference numeral 17 denotes a generator.

Referring to FIG. 2, a transmission case section 20 is provided integrally at a rear portion of the crankcase 3. A right side portion of the transmission case section 20 is open, and a transmission holder 21, which retains ends on one side of rotary shafts and guide shafts of the transmission, covers the transmission case section 20 and serves also as a lid member. In FIG. 2, a mating surface 20*a* of the transmission case section 20 to the transmission holder 21 is shown so that an outer shell of a cartridge type transmission 19 is formed.

As shown in FIG. 2, a main shaft 22, a countershaft 23, a shift drum 24, and so forth are disposed in the transmission case section 20 integrated with the crankcase 3. The countershaft 23 is disposed below the main shaft 22 and the shift drum 24 is disposed rearwardly of the main shaft 22 to extend in parallel to each other.

Referring to FIG. 1, the main shaft 22 is supported at a right end portion thereof for rotation on the transmission holder 21 through a bearing 25 and projects, at an end portion of the same, from an opening 21*a* of the transmission holder 21, and a multiple disk clutch 27 is provided at the projecting shaft portion. The clutch is normally in a connected state and is disconnected when a hydraulic operation apparatus 28 operates. Further, a primary driven gear 29 is loosely fitted on the main shaft 22 and meshes with the primary driving gear 16 attached to the crankshaft 7. The left end of the main shaft is supported for rotation on the crankcase 3 through a bearing 26, and an end portion thereof is closed up with the crankcase 3.

Rotational driving force of the crankshaft 7 is transmitted to the main shaft 22 through the meshing engagement between the primary driving gear 16 provided on the right end side of the crankshaft 7 and the primary driven gear 29 on the main shaft 22 and an engaging and disengaging action of the multiple disk clutch 27 by operation of the hydraulic operation apparatus 28.

The countershaft 23 is supported at the right end thereof for rotation on the transmission holder 21 through a bearing 30 and is closed up at an end portion thereof with the transmission holder 21. Meanwhile, the countershaft 23 is supported at the left end thereof on the crankcase 3 through a bearing 31 and projects outwardly at an end portion thereof through the crankcase 3. A rear wheel driving sprocket wheel 32 is attached to the projecting end portion of the countershaft 23.

Six gears M1 to M6 are provided on the main shaft 22 while six gears C1 to C6 are provided at opposing positions to the gear wheels on the countershaft 23 and normally held in meshing engagement with the gear wheels. By movements of shift forks 41, 42, and 43 upon rotation of the shift drum 24, one of combinations of the gear wheels of the above-described transmission gear group G, which normally mesh with each other, is selected so that rotation of the main shaft 22 is transmitted at a desired transmission gear ratio to the countershaft 23.

The driving force transmitted to the countershaft 23 is transmitted to a rear wheel 108 (FIG. 7) of the vehicle through a rear wheel driving sprocket wheel 32 at the left end of the countershaft 23, a driven sprocket wheel not shown and an endless chain 33 extending between and around the two sprocket wheels.

The shift drum 24 disposed rearwardly of the main shaft 22 is supported at the opposite end portions thereof on the lower case 3B of the crankcase and the transmission holder 21 through bearings 34 and 35, respectively, as shown in FIG. 1. The axial line of rotation of the shift drum 24 extends in parallel to the main shaft 22 and the countershaft 23.

Referring to FIG. 2, two guide shafts 36 and 37 are provided in spaces between the shift drum 24 and the main shaft 22 and between the shift drum 24 and the countershaft 23 such that the shafts 36 and 37 extend in parallel to the axial line of the shift drum 24. The two guide shafts 36 and 37 are supported fixedly at the opposite end portions thereof on the lower case 3B of the crankcase 3 and the transmission holder 21, respectively, as shown in FIG. 1. Further, the shift fork 41 is attached for sliding movement on the guide shaft 36 and the shift forks 42 and 43 are attached for sliding movement on the guide shaft 37 as shown in FIGS. 1 and 2.

Figure 3:
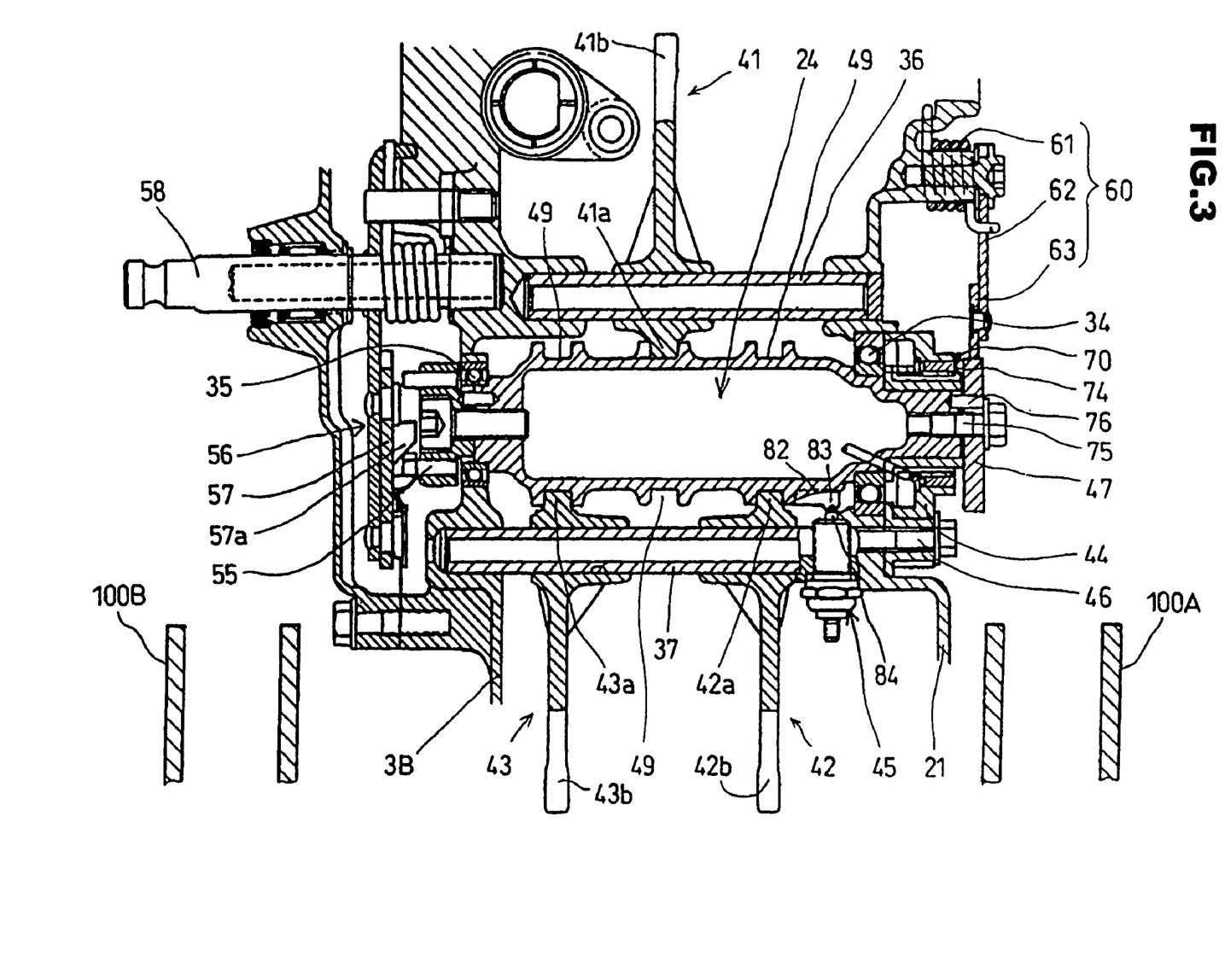
FIG. 3 is a sectional view of a shift drum and relating parts of the internal combustion engine.

FIG. 3 is a sectional development of the shift apparatus section around the shift drum 24. As shown in FIG. 3, the shift drum 24 is formed from a hollow cylindrical member having a predetermined length and is usually formed as a cast member of cast iron. The shift drum 24 has a rather reduced diameter in a drawn manner at the opposite end portions thereof. The shift drum 24 is supported at the opposite end portions thereof for rotation on the lower case 3B of the crankcase 3 and the transmission holder 21 by means of the bearings 34 and 35 mounted at the reduced diameter portions. Three circumferentially extending lead grooves 49 are provided on an outer periphery of the shift drum 24.

The shift forks 41, 42, and 43 are fitted for sliding movement along the guide shafts 36 and 37 through through-holes at boss portions thereof, and sliding pins 41a, 42a, and 43a are formed at the boss portions of the shift forks 41, 42, and 43 and engaged with the three lead grooves 49 provided on the outer periphery of the shift drum 24. Further, the shift forks 41, 42, and 43 have bifurcated portions 41b, 42b, and 43b formed at end portions thereof, and the bifurcated portions are individually held in engagement with grooves provided on predetermined shift gear wheels of the transmission gear group G. The bifurcated portion 41b of the shift fork 41 engages with a circumferential groove 52 between the shift gears M3 and M4 shown in FIG. 1; the bifurcated portion 42b of the shift fork 42 engages with a circumferential groove 53 of the shift gear C5; and the bifurcated portion 43b of the shift fork 43 engages with a circumferential groove 54 of the shift gear C6.

In FIG. 3, an engaging pin 55 is provided at a left end portion of the shift drum 24. By a rocking operation of a shift arm 56 interlocking with a pedal not shown through a pedal attaching shaft 58, a feeding projection 57a provided on a shifter plate 57 is engaged with or disengaged from the engaging pin 55 to rotate the shift drum 24 by a predetermined amount.

In FIG. 3, a stopper plate 47 having a star-shaped outer profile is provided at a right end portion of the shift drum 24, and a roller (not shown) of a stopper roller assembly 60 is held in resilient contact with an outer peripheral phase of the stopper plate 47 through lever members 62 and 63 biased by resilient force of a spring member 61. Rotation of the shift drum 24 is transmitted to the stopper roller assembly 60 as rocking motion against the biasing force of the spring member 61 through the recessed and projected configuration of the outer peripheral face of the stopper plate 47 thereby to provide a clicking feeling to the pedaling operation of the rider. Upon stopping of the rotation of the shift drum 24, the resilient engagement of the roller is performed with a predetermined one of the recesses of the outer periphery of the stopper plate 47 under the biasing force of the spring member 61. Consequently, the rotation stopping state after completion of a predetermined speed changing operation by the rotation of the shift drum 24 is maintained.

The shift apparatus section shown in FIG. 3 includes two gear position detection apparatus 44 and 45. One of the gear position detection apparatus is a "gear shift position detection apparatus 44" and is provided in the proximity of the right end of the shift drum 24. When the shift drum 24 rotates, the gear shift position detection apparatus 44 detects the position of a resilient contact member 70, which rotates together with the stopper plate 47 of the star-shaped outer profile provided at the right end of the shift drum 24, thereby to detect the gear position of any of the gear stages. This apparatus is attached to the transmission holder 21 by means of a bolt 46.

The other gear position detection apparatus is a "neutral position detection apparatus 45". The neutral position detection apparatus 45 is a detection apparatus attached to a lower case rear wall face portion 48 of the lower case 3B corresponding to an outer peripheral portion of the right side of the shift drum 24 such that a head portion thereof projects (FIG. 2). The neutral position detection apparatus 45 detects the position of a neutral position detection cam 83 provided on a cam face 82 of an outer periphery of the shift drum 24 to detect the neutral position in the rotation of the shift drum 24. While the neutral position is detected as one of the positions of gear position detection also by the gear shift position detection apparatus 44, the neutral position detection apparatus 45 detects only the neutral position in an overlapping relationship.

Figure 4A:
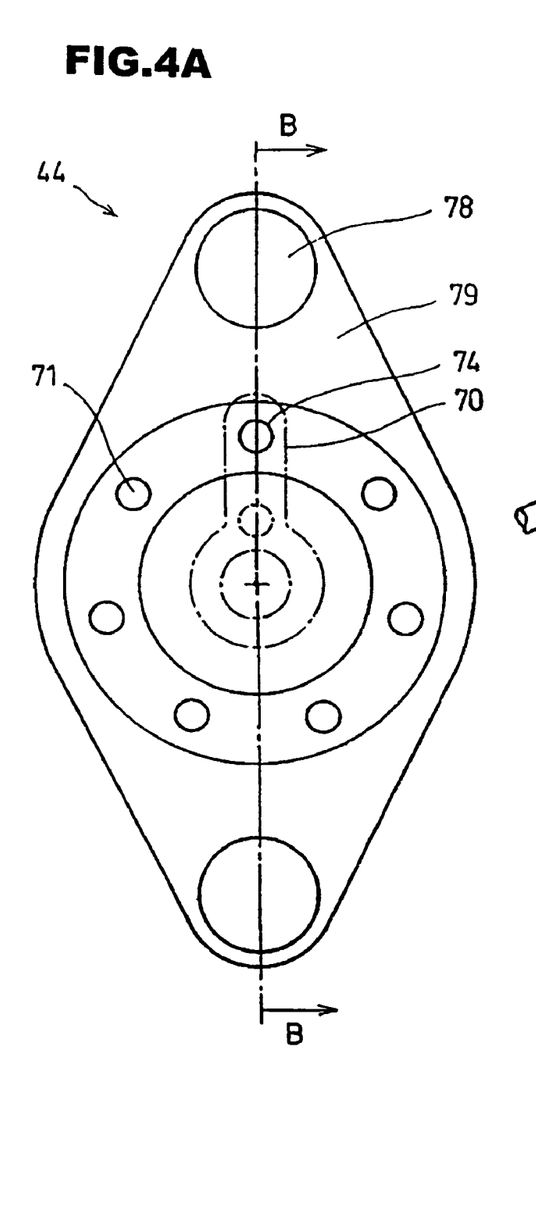
Figure 4B:
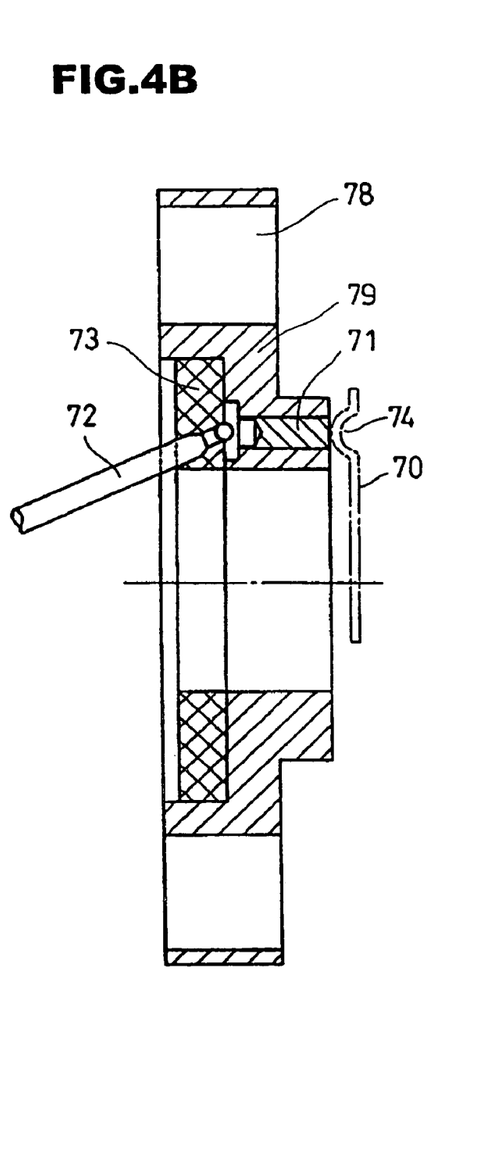
Figure 5A:
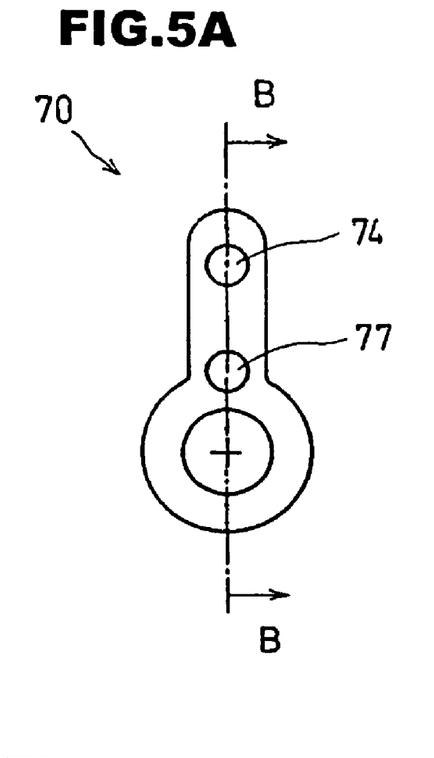
Figure 5B:
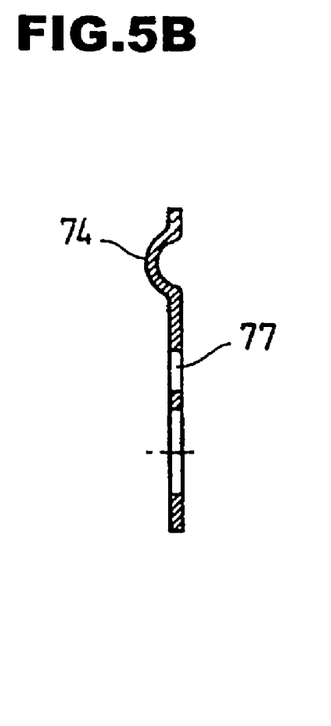

Now, details of the gear shift position detection apparatus 44 are described. FIGS. 4(a) and 4(b) are enlarged plane views of the gear shift position detection apparatus 44, and FIGS. 5(a) and 5(b) are enlarged plane views of the resilient contact member 70, which is a counterpart member of the gear shift position detection apparatus 44. FIGS. 4(a), 4(b), 5(a), and 5(b) are enlarged views enlarged at an equal ratio. The mounting positions of the members are shown in FIG. 3. In FIGS. 4(a) and 4(b), a relative position of the resilient contact member 70 to the gear shift position detection apparatus 44 is indicated by an alternate long and short dash line.

The gear shift position detection apparatus 44 includes a body portion 79 made of a phenol resin and has a plurality of terminals 71 (seven in the present embodiment) provided on one side thereof as shown in FIGS. 4(a) and 4(b). The terminals 71 include six terminals corresponding to the first to sixth speeds and one terminal corresponding to the neutral position. The terminals 71 are disposed at the rotation stopping positions of the shift drum 24. The positions depend upon the recesses of the outer periphery of the star-shaped stopper plate 47 with respect to the predetermined gear shift position. A conductor 72 for energization is connected to each of the terminals 71. It is to be noted that reference numeral 73 denotes a filled portion of a resin (for example, an epoxy resin), and 78 an insertion hole for the bolt 46 (FIG. 3).

The resilient contact member 70 of FIGS. 5(a) and 5(b) are made of a conductive metal and has, at an end portion thereof, a contact portion 74 formed from a protrusion for contacting with any of the terminals 71 of the gear shift position detection apparatus 44. The contact portion 74 normally contacts under suitable resilient force with one side of the gear shift position detection apparatus 44 on which the terminals 71 are provided under the resilient force of the contact portion 74. The resilient contact member 70 is secured to the right end of the shift drum 24 together with the star-shaped stopper plate 47 by means of a bolt 75 as shown in FIG. 3 and is rotated in an interlocking relationship with rotation of the shift drum 24 by means of a pin 76. An insertion hole 77 for the pin 76 is shown in FIG. 5. In FIG. 4, a relative position of the resilient contact member 70 to the gear shift position detection apparatus 44 is indicated by an alternate long and short dash line as described hereinabove.

When rotation of the stopper plate 47 stops at a predetermined gear shift position during rotation of the shift drum 24, through contact of the contact portion 74 with a predetermined one of the terminals 71 corresponding to the rotation stopping position, energization through the terminal 71 is performed. Consequently, a signal corresponding to the predetermined gear shift position is transmitted through the conductor 72 connected to the terminal 71 to a display section of an instrument panel not shown at a front portion of the vehicle body so that the display section is lit to display the signal so that the predetermined gear shift position is recognized by the rider.

Figure 6:
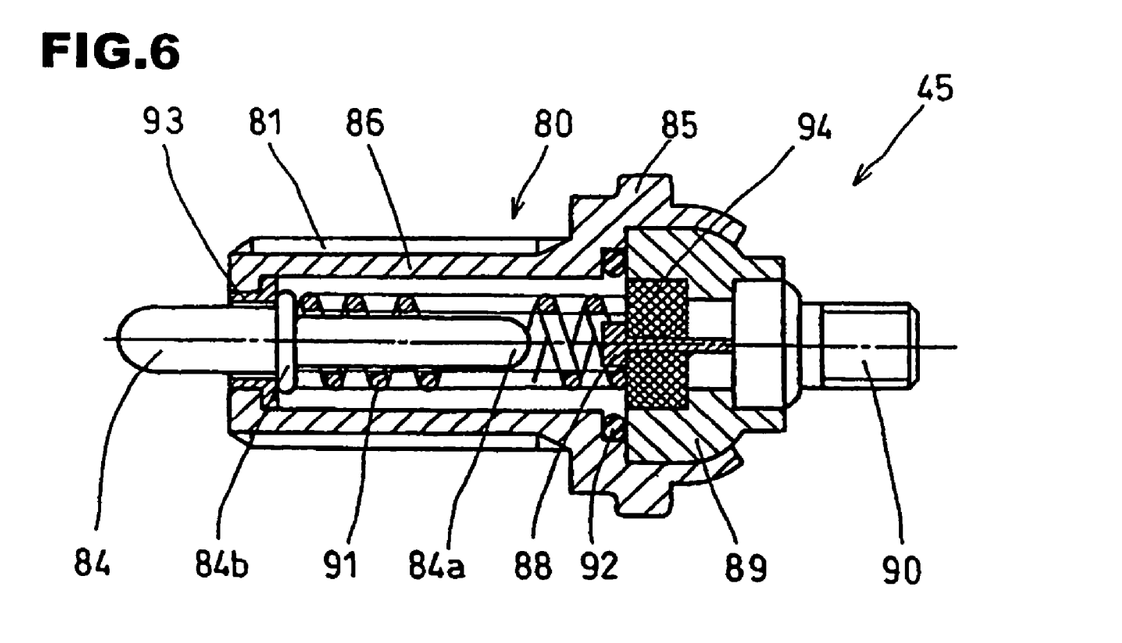
FIG. 6 is a vertical sectional view of a neutral position detection apparatus.

Now, the neutral position detection apparatus 45 is described. FIG. 6 is a sectional view of the neutral position detection apparatus 45. The neutral position detection apparatus 45 is attached to the lower case rear wall face portion 48 of the lower case 3B of the transmission case section 20 by a male thread 81 of a body portion 80 of the neutral position detection apparatus 45 from the outside of the wall face portion as shown in FIG. 2. Further, as a counterpart apparatus of the neutral position detection apparatus 45, the cam face 82 is formed in a juxtaposed relationship with the lead grooves 49 on the outer circumferential face of the right end portion of the shift drum 24 shown in FIG. 3. The neutral position detection cam 83 corresponding to the neutral action point is provided on the cam face 82, and a detection pin 84 of the neutral position detection apparatus 45 is spaced by a small distance from or contacts under slight pressing force with the cam face 82.

As seen in FIG. 6, the body portion 80 of the neutral position detection apparatus 45 has a head portion 85 having a hexagonal portion for being caught by a spanner, a hollow shaft portion 86 extending from the head portion 85, and the male thread 81 provided on an outer periphery of the shaft portion. The hollow portion of the body portion 80 includes the detection pin 84 projecting from an end portion of the shaft portion 86, a contact plate 88 with which an inner end 84a of the detection pin can contact, a base terminal portion 89 secured integrally to the head portion 85, a conductor connecting portion 90 connected to the base terminal portion 89, and so forth.

The detection pin 84 is movable in an axial direction relative to the body portion 80 in the hollow shaft portion 86 of the body portion 80 and is biased by a spring member 91 disposed in the body portion 80 such that an end portion thereof normally projects outwardly through a flange portion 84b thereof. When the end portion is pushed in from the outside, the inner end 84a is brought into contact with the contact plate 88 to allow energization so that a signal is transmitted from the conductor connecting portion 90 through a conductor not shown to the display section disposed on the instrument panel at a front portion of the vehicle body. Consequently, the display section is lit to display the signal. This lighting display is different from the lighting display of the neutral position by the gear shift position detection apparatus 44, and the display of the neutral position by the neutral position detection apparatus 45 is light to display clearly at a position at which the rider is most readily to take notice. It is to be noted that reference 92 denotes an O-snap ring, 93 a sliding guide member made of a resin, and 94 a spring receiving member made of a resin.

The contact of the detection pin 84 of the neutral position detection apparatus 45 with the cam face 82 is performed such that the detection pin 84 contacts in a perpendicular direction with the cam face 82. In particular, the neutral position detection apparatus 45 is attached such that the detection pin 84 extends perpendicularly to the cylindrical surface of the shift drum 24, that is, it is directed to the axial line of the shift drum as viewed in a side elevation (FIG. 2). A case outer wall face of the transmission case section 20 is a wall face directed rather downwardly and curved such that it goes round downwardly and a little forwardly, and the neutral position detection apparatus 45 is attached in such a posture as described above to the lower case rear wall face portion 48 by means of the male thread 81 of the hollow shaft portion 86 from the outside of the wall face portion 48 in such a state that the head portion thereof projects as seen in FIGS. 2 and 3. The mounting position of the detection apparatus 45 is a position in the proximity of the upward and downward parting line of the crankcase 3 and an adjacent portion to the mating surface 20a of the transmission holder 21.

Figure 7:
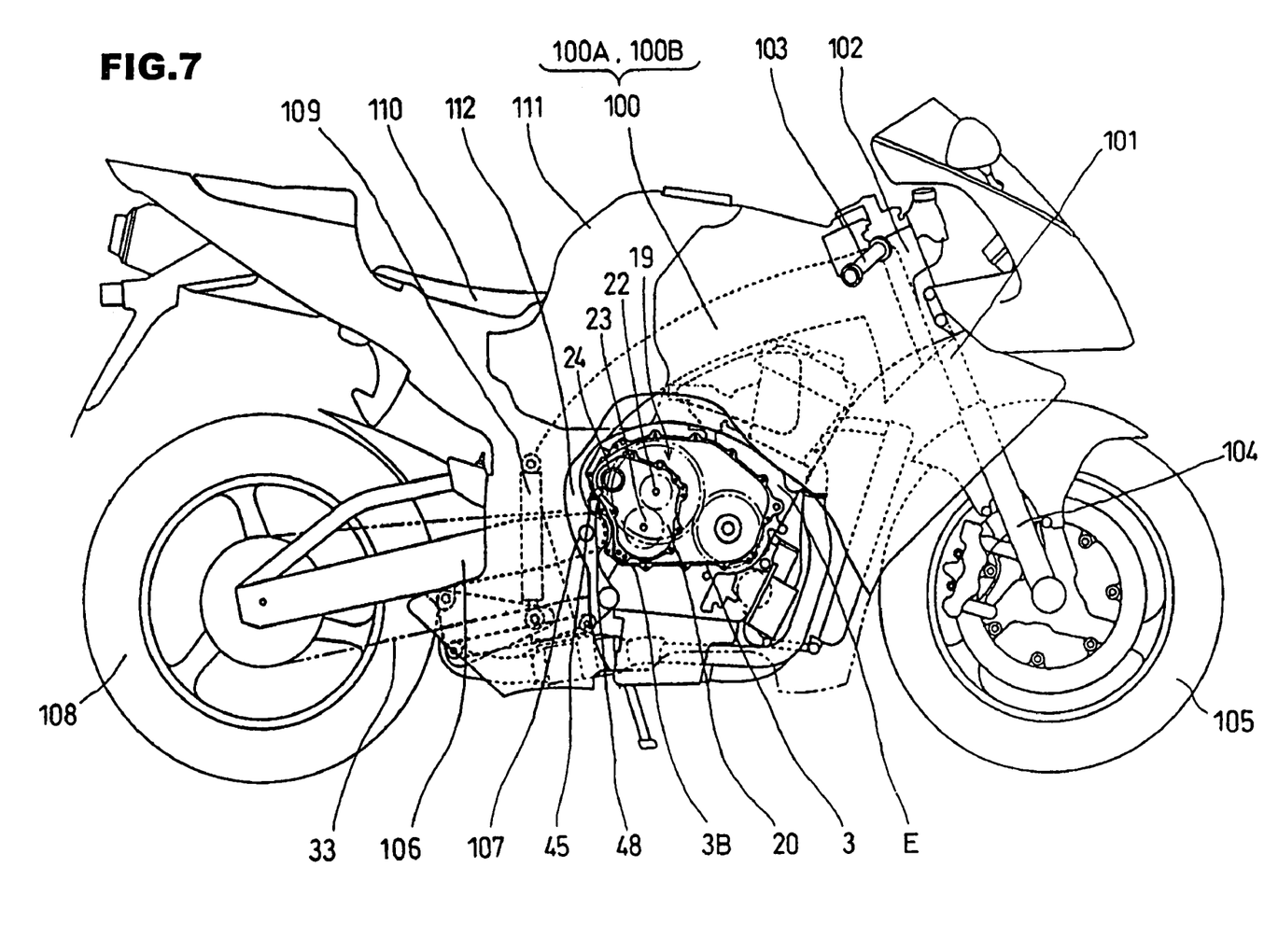
FIG. 7 is a side elevational view of a motorcycle to which the internal combustion engine of the present invention is attached.

Now, the attaching position of the internal combustion engine E and the attaching position and the attaching structure of the neutral position detection apparatus 45, which is one of the gear position detection apparatus, are described from a point of view of the overall structure of the vehicle body of the motorcycle. The motorcycle according to the present embodiment includes, as shown in FIG. 7, a main frame 100 composed of a pair of frames 100A and 100B extending a little upwardly to the front and curved downwardly by a great amount to the rear.

Front end portions of the pair of frames forming the main frame 100 are connected to a head pipe 101, and a steering shaft 102 is attached to the head pipe 101. A handle bar 103 is secured to an upper portion of the steering shaft while a front fork 104 is attached to a lower portion of the steering shaft, and a front wheel 105 is supported on the front fork 104.

At a position a little below a curved portion 112 from which the rear portion of the main frame 100 is directed downwardly, a swing arm 106 is supported for rocking motion by a swing arm pivot 107 between the pair of frames 100A and 100B, which form the main frame 100, in such a state that a front end portion is sandwiched. A rear wheel 108 serving as a driving wheel is supported for rotation between bifurcated rear end portions of the swing arm 106. It is to be noted that reference numeral 109 denotes a damper, and 110 a seat.

A fuel tank 111 is attached to an upper portion of the main frame 100, which extends forwardly and a little upwardly to extend across the main frame 100. The internal combustion engine E is carried in a space surrounded by the portion of the main frame 100 extending forwardly and a little upwardly, a lower portion of the main frame 100, and the curved portion 112 of a rear portion of the main frame 100, which is curved downwardly, such that the cylinder head section thereof is directed forwardly obliquely upwards. The cartridge type transmission 19 is formed at a rear portion of the crankcase 3. In the carried state, the cartridge type transmission 19 is positioned closely to the curved portion 112 of the main frame 100, and part of a rear portion of the cartridge type transmission 19 is positioned above the swing arm pivot 107. In the cartridge type transmission 19, the countershaft 23 is disposed below the main shaft 22 while the shift drum 24 is disposed rearwardly of the main shaft 22.

Since no rotary shaft exists at a position rearwardly of the countershaft 23 below the shift drum 24, the case wall face of the rear portion of the transmission case section 20 is curved to go round downwardly and a little forwardly at the portion to form a recessed portion. Since the swing arm pivot 107 is disposed at the location, the pivotally supporting point of the swing arm can be advanced when compared with that of a conventional transmission, which includes arrangement of a rotary shaft. Consequently, the length of the swing arm can be increased, and the range of the rocking motion of the swing arm can be increased to decrease the variation of the posture of the vehicle body.

In the transmission case section 20 occupying the position close to the curved portion 112 at the rear portion of the main frame 100, which is directed downwardly, the neutral position detection apparatus 45 with respect to the shift drum 24 disposed at a rear portion in the transmission case section 20 is attached to the lower case rear wall face portion 48 of the lower case 3B of the crankcase 3 such that the head portion of the apparatus is directed rearwardly of the vehicle body and a little downwardly and projects outwardly, and the attaching position is positioned above the swing arm pivot 107. Consequently, the swing arm serves as a barrier and prevents such a solid matter as a stone leaped up from the road surface during traveling of the vehicle from colliding with the gear position detection apparatus.

As described in detail above, in the motorcycle of the present invention, the transmission, which forms part of the internal combustion engine E, is formed as a cartridge type transmission 19, and the internal combustion engine is disposed on the vehicle body frame such that, in a state wherein the cartridge type transmission 19 is carried on the vehicle, the countershaft 23 is disposed below the main shaft 22 while the shift drum 24 is disposed rearwardly of the main shaft 22 and the swing arm pivot 107 is disposed in the recessed portion of the case wall face of the rear portion of the transmission case section 20, which is curved to go around downwardly and a little forwardly, such that the rear portion of the cartridge type transmission 19 is positioned above the pivotally supporting point of the swing arm. Consequently, the pivotally supporting point of the swing arm can be advanced with respect to the internal combustion engine, and the movable range of the rear portion of the swing arm is increased and the variation of the posture of the vehicle body can be reduced. Further, where the transmission is formed as a cartridge type transmission, inspection and replacement of a part of the transmission are facilitated.

Further, since the internal combustion engine is disposed on the vehicle body frame such that the gear position detection apparatus for detecting the rotated position of the shift drum provided in the transmission is positioned above the pivotally supporting point of the swing arm, the swing arm is disposed below the gear position detection apparatus. Consequently, the swing arm serves as a barrier and prevents such a solid matter as a stone leaped up from the road surface during traveling of the vehicle from colliding with the gear position detection apparatus. Consequently, protection of the sensor can be anticipated.

While the invention has been described in particular embodiments, it is to be understood that the words which have been used are words of description rather than limitation and that changes within the purview of the appended claims may be made without departing from the true scope and spirit of the invention in its broader aspects.

We claim:

1. A motorcycle comprising:
    an internal combustion engine supported on a vehicle body frame and including a crankshaft extending in leftward and rightward directions of a vehicle body,
    a swing arm supported for pivotal motion on said vehicle body frame,
    a sprocket wheel provided on said internal combustion engine for driving a rear wheel supported for rotation at a rear end portion of said swing arm, and
    a transmission forming part of said internal combustion engine for transmitting rotational motion of said crankshaft to said sprocket wheel,
    wherein said transmission is a cartridge type transmission, and said internal combustion engine is disposed on said vehicle body frame such that a rear portion of said cartridge type transmission is positioned above the pivotally supporting point of said swing arm.

2. The motorcycle according to claim 1 wherein said cartridge type transmission comprises a case wall having a curved rear portion to form a recessed portion and the pivotally supporting point of said swing arm is disposed at the recessed portion.

3. The motorcycle according to claim 1, wherein said cartridge type transmission includes a main shaft, a countershaft, and a shift drum parallel to said crankshaft, and in a state wherein said cartridge type transmission is carried on said vehicle, said countershaft is positioned below said main shaft and said shift drum is disposed rearwardly of said main shaft, and that a driving sprocket wheel for driving said rear wheel is provided on said countershaft.

4. The motorcycle according to claim 1, wherein said transmission includes a shift drum; and further comprising a gear position detection apparatus for detecting a rotational position of the shift drum, and the gear position detection apparatus is positioned above the pivotally supporting point of said swing arm.

* * * * *